US008653679B2

(12) United States Patent
Lim et al.

(10) Patent No.: US 8,653,679 B2
(45) Date of Patent: Feb. 18, 2014

(54) PORTABLE POWER SUPPLY HAVING BOTH INVERTER POWER SUPPLY AND TRADITIONAL POWER SUPPLY RECEPTACLES

(75) Inventors: Sie Teong Lim, Brookfield, WI (US); Kenny J. Stair, North Prairie, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 92 days.

(21) Appl. No.: 13/195,387

(22) Filed: Aug. 1, 2011

(65) Prior Publication Data

US 2012/0038171 A1 Feb. 16, 2012

Related U.S. Application Data

(60) Provisional application No. 61/372,604, filed on Aug. 11, 2010.

(51) Int. Cl.
*H02K 5/00* (2006.01)

(52) U.S. Cl.
USPC .......................................................... 290/1 A

(58) Field of Classification Search
USPC .......................................................... 290/1 A
See application file for complete search history.

(56) References Cited

U.S. PATENT DOCUMENTS

| | | | | |
|---|---|---|---|---|
| 6,534,958 | B1 * | 3/2003 | Graber et al. | 322/11 |
| 7,015,404 | B2 | 3/2006 | Sodemann et al. | |
| 7,095,126 | B2 * | 8/2006 | McQueen | 290/1 A |
| 7,104,847 | B2 | 9/2006 | Sodemann et al. | |
| 7,129,592 | B1 * | 10/2006 | Yetter | 290/1 A |
| 7,161,253 | B2 | 1/2007 | Sodemann et al. | |
| 7,471,505 | B2 | 12/2008 | Gull et al. | |
| 7,573,145 | B2 * | 8/2009 | Peterson | 290/44 |
| 7,781,902 | B2 | 8/2010 | Cerney et al. | |
| 2002/0167174 | A1 * | 11/2002 | Haass et al. | 290/1 A |
| 2005/0242783 | A1 | 11/2005 | Nakagawa et al. | |
| 2007/0182158 | A1 | 8/2007 | Cerney et al. | |

* cited by examiner

*Primary Examiner* — Tho D Ta

(74) *Attorney, Agent, or Firm* — Andrus Intellectual Property Law, LLP

(57) ABSTRACT

A generator for providing electric power. The generator includes an engine associated with an alternator. Rotation of the engine causes the alternator to generate an AC source voltage that is fed to at least one analog output receptacle. The generator further includes an inverter connected to receive the AC source voltage and generate a digital AC output voltage having a constant voltage value and a constant frequency. The inverter allows the engine to operate at less than full speed when an electric load is drawing a relatively low amount of power from the generator. The analog receptacle allows larger electric loads to be connected to the generator where the electric loads cannot be supported by the digital AC output voltage.

16 Claims, 4 Drawing Sheets

PORTABLE POWER SUPPLY HAVING BOTH INVERTER POWER SUPPLY AND TRADITIONAL POWER SUPPLY RECEPTACLES

CROSS-REFERENCE TO RELATED APPLICATION

The present application is based on and claims priority to U.S. Provisional Patent Application Ser. No. 61/372,604 filed Aug. 11, 2010, the disclosure of which is incorporated herein by reference.

BACKGROUND OF THE INVENTION

The present disclosure generally relates to a generator. More specifically, the present disclosure relates to a hybrid generator that can supply both an AC source voltage from an alternator and a regulated AC output voltage from an inverter that has a constant voltage and a constant frequency.

Generators that supply a source of electrical power to a remote location or in locations where access to utility power is interrupted or unavailable are well known and in wide use. Presently, two general types of generators are available. The first generator type provides a source of backup energy in the event of a utility power failure. The generator includes one or more receptacles that receive plugs from electrical loads that are to be operated. Traditionally, the engine of such a generator is operated at a constant speed, regardless of the load, to provide a usable source of power having a relatively constant frequency. The constant operation of the engine at near a maximum engine speed can cause extra noise to be generated and fuel to be used when the actual load on the generator is light or even when the generator is unloaded.

A second type of generator is referred to as an inverter-controlled generator. An inverter-controlled generator includes an alternator driven by an engine to generate an AC source voltage. The AC source voltage is fed into a rectification circuit to generate a DC output. The DC output from the rectification circuit is then fed to an inverter, which generates an AC output voltage. The output voltage of the inverter is an AC output that has a constant voltage value and a constant frequency. Although inverter-controlled generators can be operated at less than the constant, full load speed of the engine, the power created by such a generator is often limited.

SUMMARY OF THE INVENTION

The present disclosure relates to a generator that generates two different sources of AC power. The first source of AC power is directly from the alternator within the generator and supplies the AC source voltage created by the engine within the generator. The second source of AC power is through an inverter that converts the AC source voltage from the alternator to a digital output voltage that has a constant voltage value and a constant frequency.

The generator of the present disclosure includes an internal combustion engine that operates to create an AC source voltage through an alternator. When the engine is operated at full speed, the alternator generates the AC source voltage that is accessible through one or more analog output receptacles. In one embodiment of the disclosure, the generator includes two 120-volt analog output receptacles and one 240-volt analog output receptacle. Each of the analog receptacles are configured to receive a plug from an electric load such that the electric load can be driven by the AC source voltage. When electric power is supplied through one of the analog output receptacles, the engine must be operated near at full speed to create a generally constant voltage source having a generally constant frequency.

In addition to the analog output receptacles that supply the AC source voltage, the generator can also generate a digital output voltage. The digital output voltage is created by an inverter that is positioned to receive the AC source voltage from the alternator and convert the AC source voltage to a digital output voltage. In one embodiment of the disclosure, the inverter includes a rectifier that rectifies the AC source voltage to create a DC voltage. The DC voltage from the rectifier is received in an inverter circuit. The inverter circuit converts the DC voltage to a DC output voltage that has a constant value and a constant frequency. In one embodiment of the disclosure, the digital output voltage has a value of 120/240-volts AC with a frequency of 60 Hz. The digital output voltage from the inverter circuit is limited in the amount of power that can be supplied to an electric load.

The inverter is connected to at least one digital output receptacle such that the digital output voltage from the inverter is supplied to an electric load through the digital output receptacle. The maximum power available through the digital output receptacle is limited such that the digital output receptacle can supply power to electric loads having a relatively small power draw.

When an electric load is connected to the digital output receptacle, a control unit of the generator operates the engine at less than full speed. Since the AC source voltage from the alternator is fed into the inverter and converted to the digital output voltage, the frequency and voltage of the AC source voltage from the alternator can be less than a preset voltage level. In this manner, the engine of the generator can be operated at less than full speed since the inverter conditions the AC source voltage. As discussed above, operating the generator at less than the full rated speed of the engine reduces the noise of operation and reduces the fuel consumption.

When a larger power consuming load is to be operated, the larger electric load is connected to one of the analog output receptacles. Since the analog output receptacles are connected directly to the AC source voltage supplied by the alternator, the larger power consuming load can be driven through the analog output receptacle. When a load is connected to the analog output receptacle, the engine is driven at its full rated speed to generate a relatively constant voltage having a relatively constant frequency. Thus, the engine is only driven at the maximum speed when the load applied to the generator requires the additional power available from the AC source voltage.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION OF THE INVENTION

Figure 1:
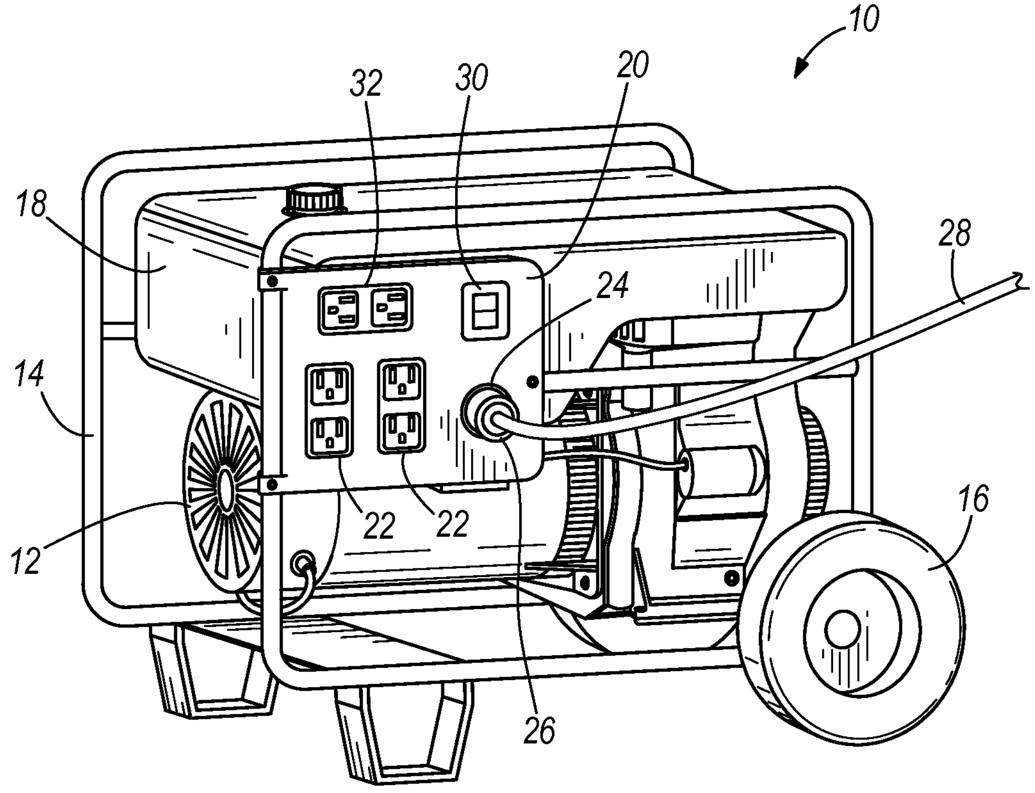
FIG. 1 is a perspective view of a generator operating in accordance with the present disclosure.

FIG. 1 illustrates a generator 10 constructed in accordance with the present disclosure. The generator 10 generally includes an internal combustion engine 12 supported on a frame 14 having a pair of wheels 16 that allows the entire generator 10 to be moved to a desired location. In the embodiment shown, the internal combustion engine 12 is supplied with fuel from a storage tank 18. However, it should be understood that the generator 10 could receive fuel from other sources while operating within the scope of the present disclosure.

The generator 10 includes an access panel 20 that provides a point of connection for various different electric loads that can be powered by the generator 10. In the embodiment shown, the access panel 20 includes a pair of analog output receptacles 22 that provide a point of connection for one or more 120-volt AC devices and an analog output receptacle 24 that allows the generator 10 to power a 240-volt AC device. In the embodiment shown in FIG. 1, a plug 26 is received within the analog output receptacle 24. The plug 26 is connected to a cord 28 that leads to a 240-volt AC load, such as a refrigerator, electric stove or dryer.

Each of the analog output receptacles 24 is configured to receive a conventional plug such that the generator 10 can provide electric power to loads connected to either one of the two analog output receptacles 22. A ground fault interrupt 30 is shown positioned on the access panel 20. However, the ground fault interrupt 30 could be eliminated while operating within the scope of the present disclosure.

In addition to the analog output receptacles, the access panel 20 further includes at least one digital output receptacle 32. The digital output receptacle 32 has a configuration similar to the analog output receptacle 22 but is fed by a different supply of power, as will be discussed in greater detail below. Although the digital output receptacle 32 and the analog output receptacles 22 are shown as positioned on the common access panel 20, it is contemplated that the receptacle could be separated and positioned on different portions of the generator 10. In such an embodiment, the separation between the output receptacles 22 and 32 would further distinguish the different operating characteristics of each receptacle.

Figure 2:
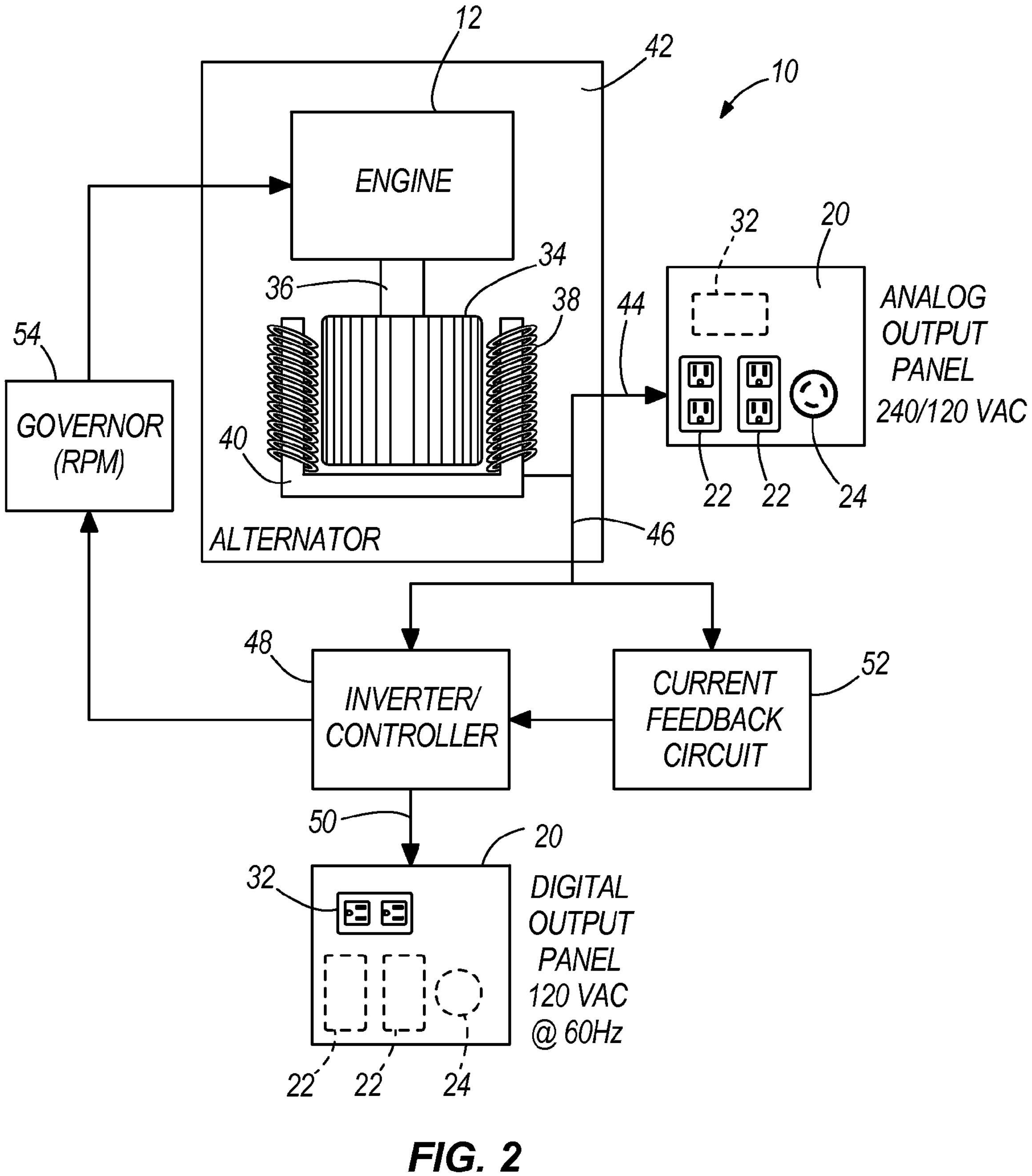
FIG. 2 is a schematic illustration showing both the analog receptacle and the digital receptacle positioned on the generator.

FIG. 2 illustrates the operating components of the generator 10. As discussed previously, the generator 10 includes an internal combustion engine 12 that rotates a rotor 34 through a drive shaft 36. The rotor 34 rotates within the windings 38 of a stator 40. The combination of the rotor 34 and the stator 40 create an alternator 42 that generates an AC source voltage along line 44. In the embodiment shown in FIG. 2, the power supply line 44 is fed into the access panel 20 and provides electrical power for the pair of analog output receptacles 22 and the analog output receptacle 24. In this manner, the access panel 20 is able to provide both 240 and 120-volts AC.

Each of the receptacles 22, 24 can receive a plug or connector to supply electrical power to any one of a series of loads. The term "connector" encompasses various different types of plugs, terminals, junctions, contact points or similar electrical connectors.

In addition to the supply line 44, the AC source voltage created by the alternator 42 is also accessible through a second supply line 46. The second supply line 46 is fed into an inverter 48. In the embodiment shown, the inverter 48 also includes a control unit. However, the control unit could be located separate from the inverter 48.

The inverter 48 is configured to receive the AC source voltage and convert the AC source voltage to a digital output voltage along line 50. The digital output voltage accessible along line 50 is fed to the access panel 20 and the digital output receptacle 32. In the embodiment illustrated, the digital output voltage on line 50 is an AC voltage having a value of 120/240-volts and a frequency of 60 Hz. However, it is contemplated that the digital output voltage could have either a different voltage value or a different frequency, depending upon the user requirements. As an example, if the generator 10 were utilized outside of the United States, the frequency may be 50 Hz.

The control unit of the inverter 48 receives information relating to the amount of current being drawn by the electric load connected to the digital output receptacle 32 through a current feedback circuit 52. The current feedback circuit 52 monitors the amount of current being drawn by the electric load and provides this information to the controller within the inverter 48. Based upon this information, the controller can then determine whether the electric load is drawing power nearing the maximum power that can be supplied from the inverter 48. If the power draw approaches the maximum power supply available through the inverter 48, the control unit may generate a warning or indicator signal to the user.

As illustrated in FIG. 2, the inverter 48 is connected to a governor 54. The governor 54, in turn, is in communication with the engine 12 and controls the speed at which the engine 12 is operated. Preferably, the engine 12 is operated at less than its maximum speed when an electric load is being driven by the digital output receptacle 32. Since the inverter 48 is positioned between the alternator 42 and the electric load, the inverter 48 converts the AC source voltage from the alternator 42 to a controlled, regulated, digital AC output voltage. Since the inverter 48 conditions the AC source voltage on line 46, the engine 12 can be operated at much less than its maximum speed since the inverter 48 conditions the signal to generate the digital output voltage having the constant voltage and constant frequency.

Although the inverter 48 is able to create the digital output voltage, the power available through the inverter is limited as compared to the power available directly from the connection along line 44 to the AC source voltage. Thus, when a load needs to receive power and the load will draw a significant amount of power, the load must be connected to one of the analog output receptacles 22 or 24. However, if the load is going to draw a relatively low amount of power, such as a light or similar load, the load can be connected to the digital output receptacle 32. Since the engine 12 can be operated at much less than its rated speed to operate the inverter 48, the use of the digital output receptacle allows the engine to be operated at a lower speed, which results in less fuel consumption and less noise.

Figure 3:
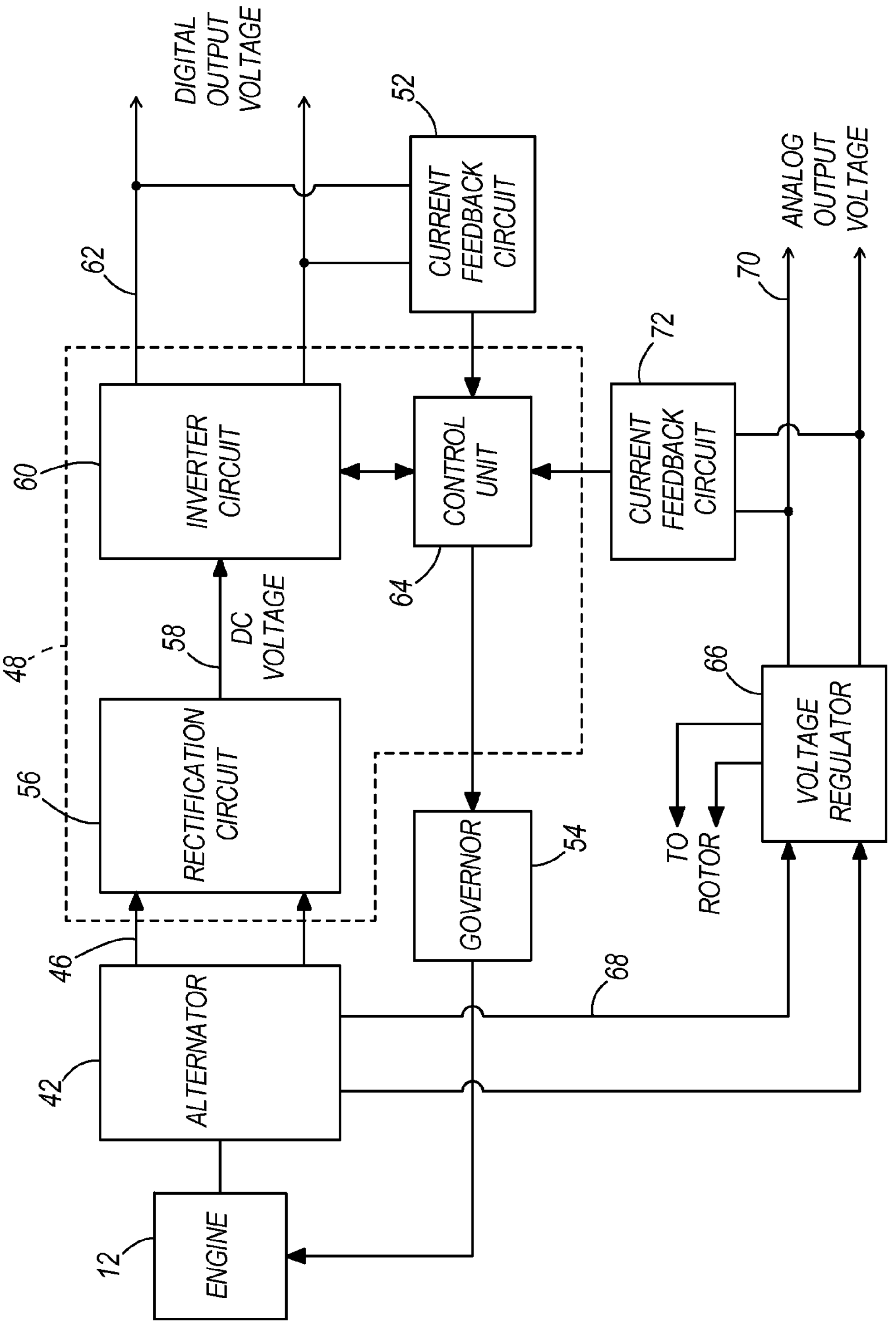
FIG. 3 is a schematic illustration of the operating components to generate the constant AC output voltage.

Referring now to FIG. 3, thereshown is one contemplated embodiment of the inverter 48. In the embodiment shown, the inverter 48 includes a rectification circuit 56 that receives the AC source voltage along line 46. The AC source voltage from the alternator 42 is received within the rectification circuit 56. Preferably, the rectification circuit 56 receives the AC source voltage and creates a DC voltage that is generated along line 58. In one embodiment, the rectification circuit 56 can include a series of diodes that create the DC voltage along line 58.

The DC voltage available along line 58 is received within an inverter 60. The inverter circuit 60 converts the DC voltage along line 58 to an AC voltage that has a constant voltage value and a constant frequency. As an example, the inverter circuit 60 creates a constant digital AC output voltage along line 62 that has a value of 120/240-volts and a frequency of 60 Hz.

In the embodiment shown in FIG. 3, the control unit 64 is separate from the inverter circuit 60. The control unit 64 controls the operation of the inverter circuit 60, receives current information from the current feedback circuit 52 and generates signals to the engine 12 through the governor circuit 54. As the current draw increases, the control unit 64 increases the engine speed through the governor circuit 54. However, the amount of current that can be drawn along line 62 is limited by the inverter circuit 60 and the rectification circuit 56. Thus, the engine 12 is operated at less than its maximum rated speed when a load is being supplied through the voltage available along line 62.

As shown in FIG. 3, a voltage regulator 66 is connected to the alternator 42 to receive an AC source voltage along the force lines 68. The voltage regulator 66 regulates the AC source voltage and creates the analog output voltage along lines 70.

A second current feedback circuit 72 is connected to the output lines 70 and provides current feedback to the control unit 64. As described above, the control unit 64 controls the engine speed through the governor 54.

Figure 4:
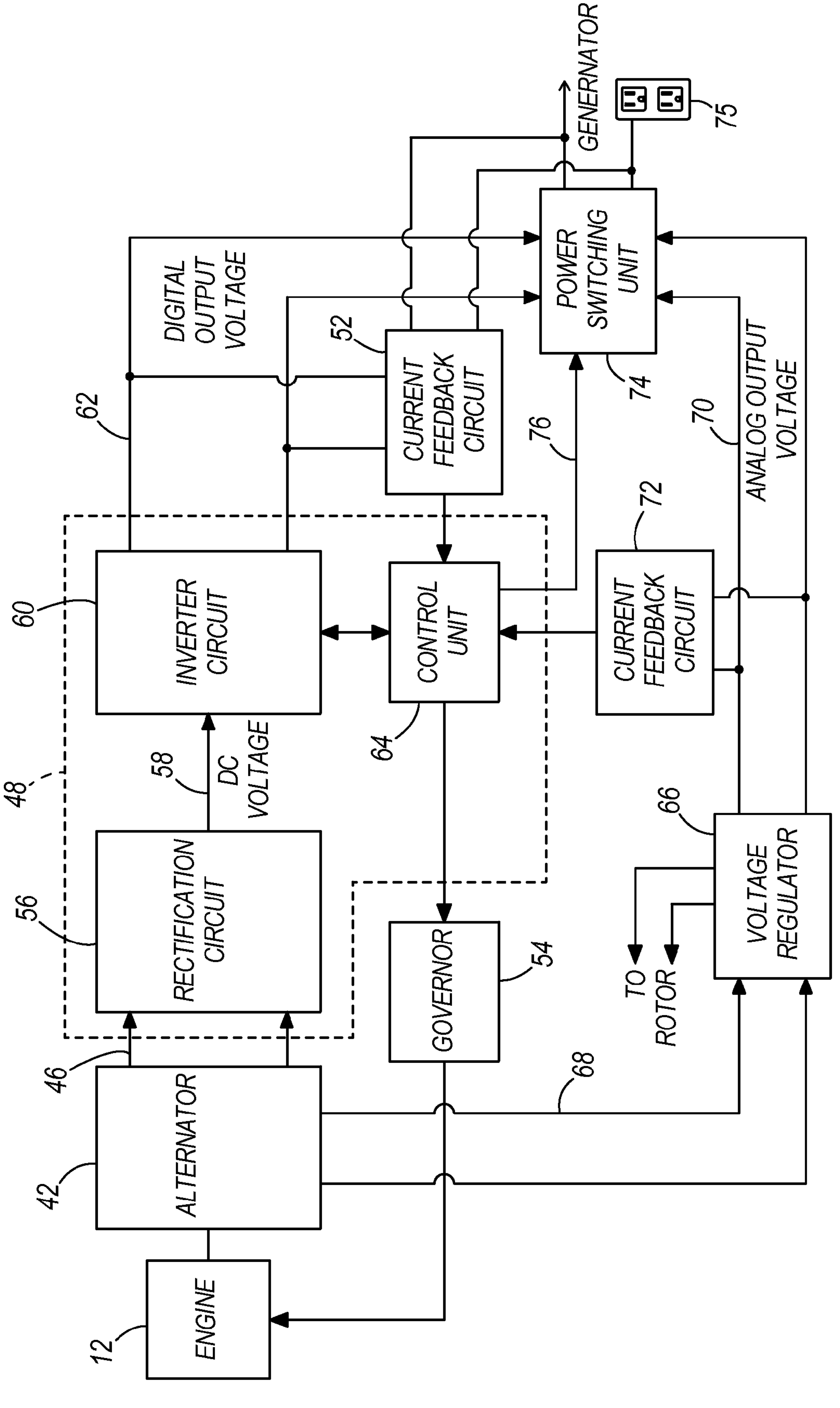
FIG. 4 is a schematic illustration of the operating components of an alternate embodiment that utilizes a power switching unit to control the generation of either the digital output voltage or the analog output voltage.

FIG. 4 illustrates yet another contemplated alternate embodiment for the inverter 48. In the embodiment shown in FIG. 4, the control unit 64 is programmed/set to a preset current draw amount. The system shown in FIG. 4 includes a power switching unit 74 that receives both the digital output voltage from line 62 and the analog output voltage supplied along lines 70. The power switching unit 74 is able to switch the output to the receptacle 75 to either the digital output voltage or the analog output voltage based upon the control signal from the control unit received along line 76.

When the control unit 64 determines that the current feedback signal from the current feedback circuit 52 exceeds the preset level in the control unit 64, the control unit 64 generates the control signal along line 76 causing the power switching unit 74 to switch over to the analog output voltage.

Alternatively, if the power switching unit 74 is switched over to the analog output voltage, if the current feedback circuit 72 detects that the demand/usage falls below the preset level in the control unit 64, the control unit 64 sends a signal to the power switching unit 74 along line 76 to switch back to the digital output voltage. In this manner, the control unit 64 utilizes the digital output voltage when the current draw is below a preset value and utilizes the analog output voltage when the current draw exceeds the preset value.

In the embodiment shown in FIG. 4, the power switching unit 74 feeds a common receptacle 75 or series of receptacles. In such an embodiment, the user can simply plug a device into the common receptacle 75 and the power switching unit 74 controls whether the digital output voltage or the analog output voltage is used to power the device. The control unit 64 controls the operation of the power switching unit 74 and the governor 54 to determine whether the digital output voltage or the analog output voltage is used to power the connected devices. In such an embodiment, the user does not need to select which receptacle to use when plugging in a device. Further, if the current draw by the device increases, the control unit 64 is able to switch over from the digital output voltage to the analog output voltage without interrupting operation of the connected device.

We claim:

1. A generator comprising:

an engine;

an alternator positioned to create an AC source voltage based on the rotation of the engine;

at least one analog output receptacle connected to the alternator and configured to receive a plug from an electric load to supply the AC source voltage to the electric load;

an inverter positioned to receive the AC source voltage from the alternator and convert the AC source voltage to a digital output voltage;

at least one digital output receptacle connected to the inverter and configured to receive a plug from an electrical load to supply the digital output voltage to the electrical load, wherein only one of the analog output receptacle and the digital output receptacle is operable at a time; and a control unit positioned to monitor the power draw by the electric load connected to the digital output receptacle and control the speed of the engine such that the speed of the engine is minimized to provide for the monitored power draw.

2. The generator of claim 1 further comprising a governor in communication with the control unit and positioned between the inverter and the engine to control the speed of the engine based upon the power drawn by the electric load connected to the digital output receptacle.

3. The generator of claim 1 further comprising a selection switch mounted to the generator, wherein the analog output receptacle and the digital output receptacle are selected based upon the position of the selection switch.

4. The generator of claim 1 wherein the digital output voltage is an AC voltage.

5. The generator of claim 4 wherein the inverter converts the AC source voltage to the digital output voltage having a value of 120/240-volts and a frequency of 60 Hz.

6. The generator of claim 4 wherein the inverter includes a rectification circuit to convert the AC source voltage to a DC voltage and an inverter circuit to generate a digital AC output voltage from the DC voltage.

7. The generator of claim 1 wherein the inverter provides electric power to the electric load through the digital output receptacle up to a maximum value and wherein the AC source voltage exceeds the maximum value.

8. The generator of claim 7 wherein the engine is operated at less than full speed to supply the maximum value of the digital output voltage.

9. The generator of claim 8 wherein the engine operates at full speed for the alternator to create the AC source voltage.

10. A generator comprising:

an engine;

an alternator positioned to create an AC source voltage based upon the rotation of the engine;

at least one analog output receptacle connected to the alternator and configured to receive a plug from an electric load to supply the AC source voltage to the electric load;

a rectification circuit positioned to receive the AC source voltage and generate a DC voltage output;

an inverter circuit positioned to receive the DC voltage and generate a digital AC output voltage;

at least one digital output receptacle connected to the inverter circuit and configured to receive a plug from an electric load to supply the digital AC output voltage to the electric load, wherein only one of the analog output receptacle and the digital output receptacle is operable at a time; and a control unit positioned to monitor the power draw by the electric load connected to the digital output receptacle and control the speed of the engine such that the speed of the engine is minimized to provide for the monitored power draw.

11. The generator of claim 10 wherein the inverter circuit provides electric power up to a maximum value and wherein the alternator provides power through the analog output receptacle that exceeds the maximum value.

12. The generator of claim 10 wherein the digital AC output voltage has a constant value of 120-volts and a constant frequency of 60 Hz.

13. The generator of claim 12 wherein the engine is operated at less than full speed to supply electricity at the maximum value of the digital AC output voltage.

14. The generator of claim 13 wherein the engine operates at full speed to supply electricity to the analog output receptacle.

15. A generator comprising:

an engine;

an alternator positioned to create an AC source voltage based upon the rotation of the engine;

an inverter positioned to receive the AC source voltage from the alternator and convert the AC source voltage to a digital output voltage;

a power switching unit positioned to receive the AC source voltage and the digital output voltage;

at least one output receptacle coupled to the power switching unit, wherein the power switching unit selectively connects either the AC source voltage or the digital output voltage to the receptacle; and a control unit positioned to receive current feedback signals flour both the digital output voltage and the AC source voltage, wherein the control unit controls the operation of the power switching unit based upon the current feedback signals.

16. The generator of claim 15 further comprising a governor positioned between the engine and the control unit, wherein the control unit operates the governor to control the speed of the engine.

* * * * *